(No Model.) 2 Sheets—Sheet 2.
C. H. STRATTON.
WHEEL FENDER AND STEP COVER FOR VEHICLES.
No. 560,331. Patented May 19, 1896.
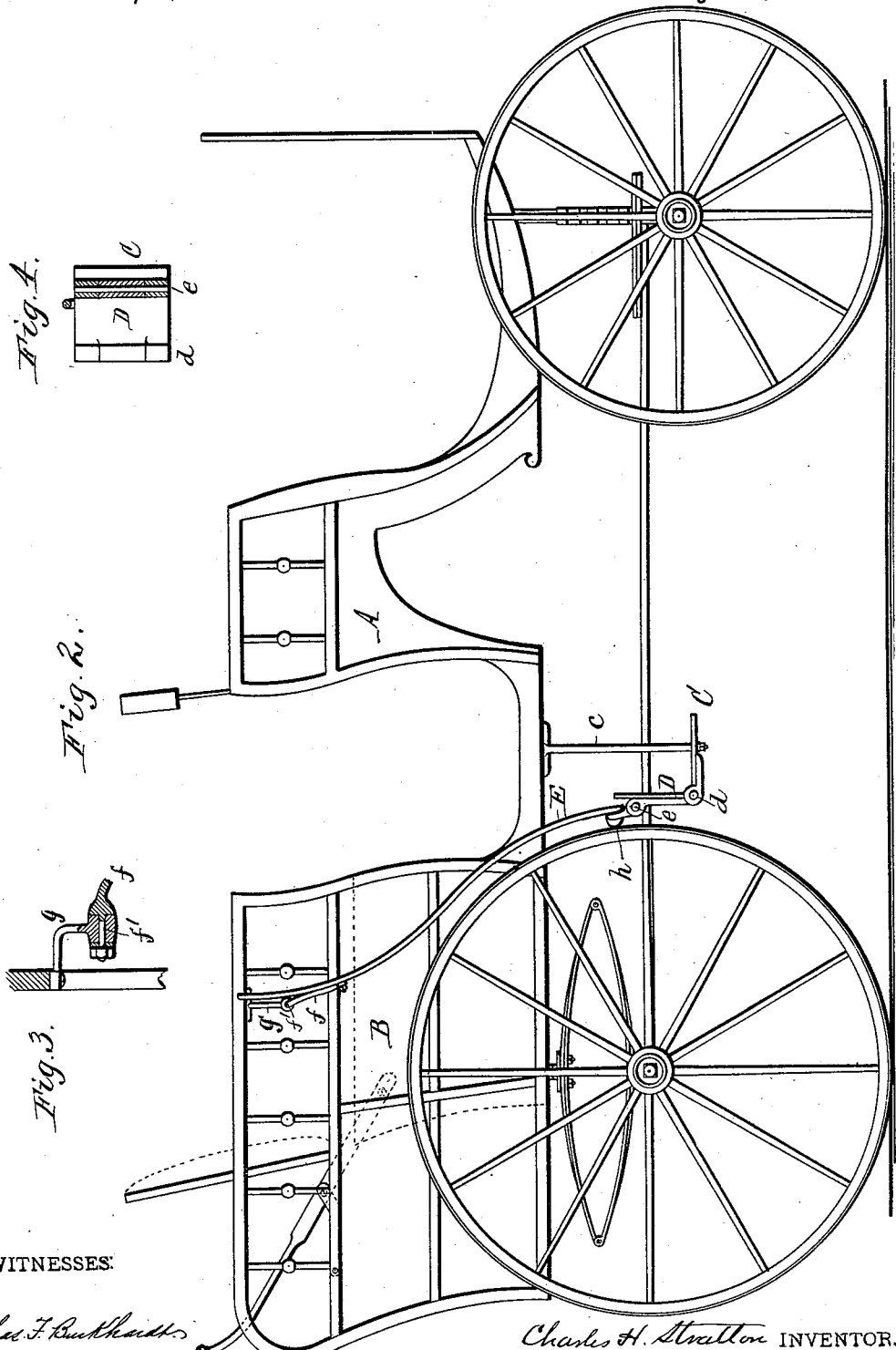
WITNESSES:
Chas. F. Burkhardt
Henry L. Deck
Charles H. Stratton INVENTOR.
By Wilhelm Bonner
ATTORNEYS.

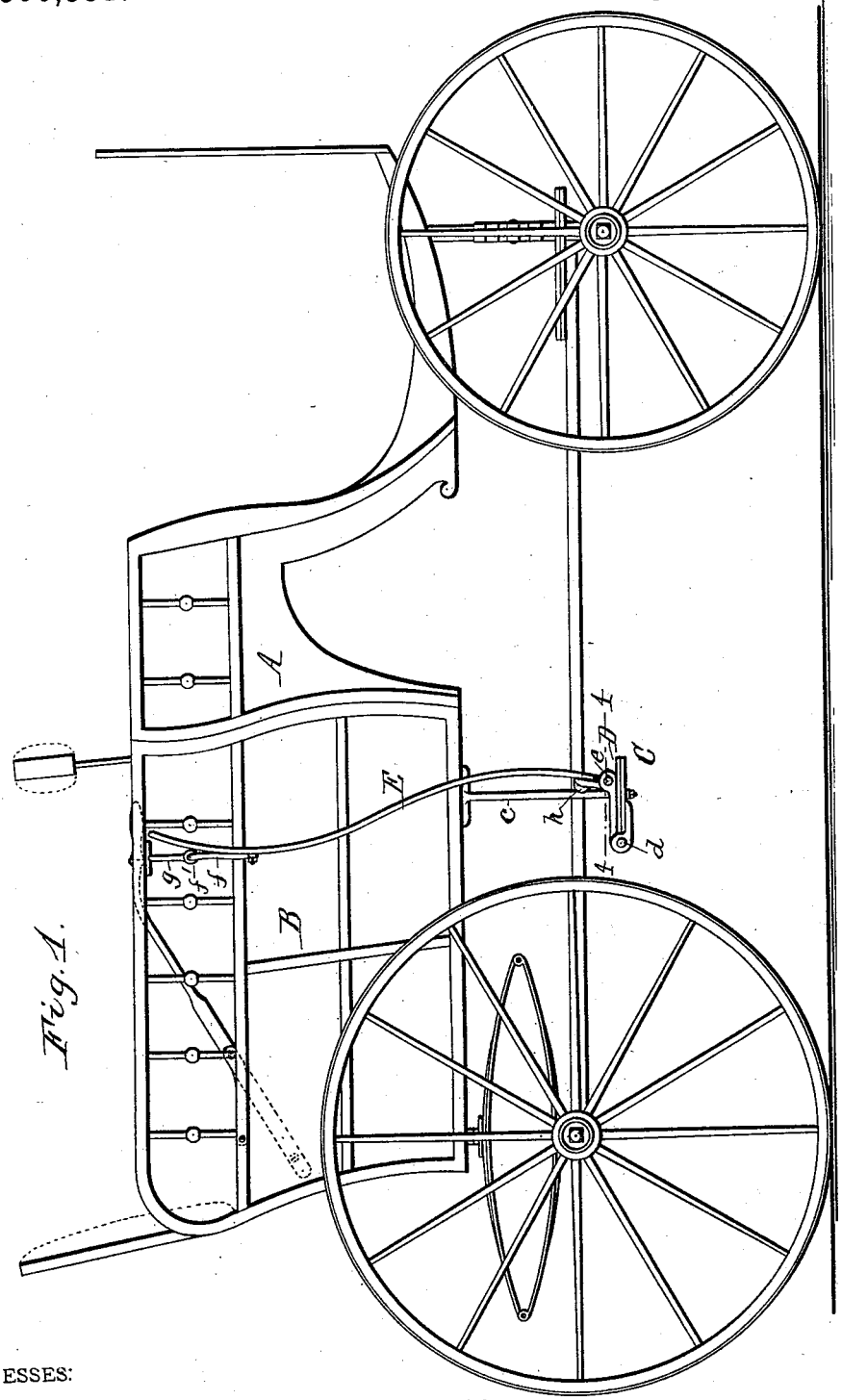

UNITED STATES PATENT OFFICE.

CHARLES H. STRATTON, OF BUFFALO, NEW YORK.

WHEEL-FENDER AND STEP-COVER FOR VEHICLES.

SPECIFICATION forming part of Letters Patent No. 560,331, dated May 19, 1896.

Application filed June 25, 1895. Serial No. 553,946. (No model.)

*To all whom it may concern:*

Be it known that I, CHARLES H. STRATTON, a citizen of the United States, residing at Buffalo, in the county of Erie and State of New York, have invented new and useful Improvements in Wheel-Fenders and Step-Covers for Vehicles, of which the following is a specification.

This invention relates to a wheel-fender and step-cover designed more especially for shifting-seat vehicles having longitudinally-movable side doors or panels—such as shown, for instance, in Letters Patent of the United States No. 517,988, granted to me April 10, 1894.

My invention has for its object to provide such vehicles with a wheel-fender and step-cover of simple construction which is operated by the movement of the side door or panel and which effectually guards the garments against contact with the wheels in entering and leaving the vehicle and prevents the accumulation of mud and dust on the step.

In the accompanying drawings, consisting of two sheets, Figure 1 is a side elevation of a vehicle provided with my improvement, showing the side panel closed. Fig. 2 is a similar view showing the side panel open. Fig. 3 is a longitudinal section, on an enlarged scale, of the joint which connects the fender with the side panel. Fig. 4 is a horizontal section of the step in line 4 4, Fig. 1.

Like letters of reference refer to like parts in the several figures.

A represents one of the stationary front panels of the vehicle-body, between which panels the front seat is arranged, and B represents one of the movable side panels or doors, which are arranged in rear of the front panels and between which the rear seat is located. These movable side panels are arranged to slide or jump rearwardly on the body, as shown and described in the Letters Patent hereinbefore referred to, or in any other suitable manner, so that the same may be shifted backward for forming passages in the sides of the body whereby access is obtained to the rear seat, as shown in Fig. 2, or be shifted forward for closing the sides of the body, as shown in Fig. 1.

C represents one of the steps of the vehicle, which is supported from the body by the usual arm or bracket $c$.

D is a cover or plate applied to the upper side of the step and connected at its rear edge to the adjacent edge of the step by a transverse hinge or pivot $d$, so as to be capable of folding down upon the step, as shown in Fig. 1, or swinging upward and rearward for uncovering the step, as shown in Fig. 2.

E represents the guard or fender, which is adapted to stand in front of the adjacent rear wheel of the vehicle when the side panel is shifted backward. The lower portion of the fender is pivotally connected with the free end of the step-cover by a transverse hinge $e$, while its upper portion is connected with the movable side panel by a hanger or link $f$. This hanger is provided at its upper end with a horizontal pivot $f'$, which is journaled in a bearing $g$ projecting from the outer side of the movable panel, as shown in Fig. 3. The pivotal connections of the fender permit the same to move backward and forward in a parallel plane with the side panel. The lower portion of the fender is curved substantially concentric with the adjacent wheel, while its upper portion is curved reversely to render the fender more sightly in appearance. The hinged step-cover forms not only a mud and dust shield for the step, but serves also as a connecting-link between the wheel-fender and the step, which retains the lower portion of the fender in its proper position while affording the necessary backward and forward movement of the same.

When the movable side panel is closed, the step-cover is folded down upon the step, thus excluding mud and dirt from the same, and the fender stands in a substantially upright position above the step. Upon shifting the side panel backward the upper portion of the fender is compelled to follow the same, thereby drawing it back to the position shown in Fig. 2, where it clears the entrance to the vehicle and protects the garments from contact with the rear wheel. The rearward movement of the panel causes the fender to rise as well as move backward, and as the lower end of the fender is connected with the step-cover it raises or unfolds the latter to the position shown in Fig. 2. Upon shifting the panel forward to its closed position the fender is moved forward and downward and the step-cover is folded down upon the step. The fender and the step-cover are thus operated simultaneously by the movements of the side panel.

The side panels may be provided with a hand-lever or other suitable means for shifting them.

$h$ is a lug or brake-shoe arranged on the rear side of the fender at or near its lower end and adapted to bear against the tire of the adjacent rear wheel in the open position of the side panel, as shown in Fig. 2. This brake-shoe is held against the wheel by the weight of the panel and checks the movement of the vehicle in entering and leaving it.

I claim as my invention—

1. The combination with the vehicle-body having a longitudinally-movable side door or panel, of a wheel-fender connected with said door or panel, so as to move backward and forward with the same and in a parallel plane therewith, whereby the fender is brought immediately in front of the adjacent rear wheel upon opening the side door, and caused to move forward with the door upon closing the same, substantially as set forth.

2. The combination with the body of a vehicle having a longitudinally-movable side door or panel and a step, of a cover or link hinged to the upper side of said step and capable of swinging upwardly parallel with said door, and a wheel-fender movable backwardly and forwardly parallel with said side door and attached at its upper end to the door and having its lower end connected with the outer portion of said hinged cover or link, substantially as set forth.

3. The combination with the body of a vehicle having a longitudinally-movable side door or panel and a step, of a cover or link pivoted to the upper side of the step by a hinge arranged transversely of the vehicle, whereby the same swings lengthwise of the vehicle-body, and a wheel-fender connected at its upper and lower ends to said side door and said cover or link, respectively, by pivots arranged transversely of the vehicle, whereby the fender is caused to move backward and forward in a parallel plane with the side door and the cover, substantially as set forth.

4. The combination with the body of a vehicle having a longitudinally-movable side door or panel and a step, of a cover or link pivoted to the upper side of the step by a transverse hinge, a fender connected at its lower end with the outer portion of said cover by a transverse hinge, and a longitudinally-swinging hanger or link having its ends connected by transverse hinges with the upper ends of the fender and said side door or panel, respectively, substantially as set forth.

Witness my hand this 3d day of June, 1895.

CHARLES H. STRATTON.

Witnesses:
CARL F. GEYER,
JNO. J. BONNER.